United States Patent [19]
Delgado et al.

[11] Patent Number: 5,713,589
[45] Date of Patent: Feb. 3, 1998

[54] SIDE STEP FOR MOTOR VEHICLE

[75] Inventors: John A. Delgado; Tommy G. Smith, both of Murrieta, Calif.

[73] Assignee: Smittybilt, Inc., Corona, Calif.

[21] Appl. No.: 397,897

[22] Filed: Mar. 3, 1995

[51] Int. Cl.$^6$ ............................................. B60R 3/00
[52] U.S. Cl. ..................... 280/163; 280/169; 182/190; 182/228
[58] Field of Search .................... 280/163, 164.1, 280/166, 169; 182/292, 90, 127, 222, 228, 64, 151, 201, 200, 195

[56] References Cited

U.S. PATENT DOCUMENTS

| | | | |
|---|---|---|---|
| H421 | 2/1988 | Glommen | 280/169 |
| 1,876,849 | 9/1932 | Bronson | 280/169 |
| 2,140,887 | 12/1938 | Tinnerman | 280/169 |
| 4,011,695 | 3/1977 | Simmons | 182/228 |
| 4,516,367 | 5/1985 | Molinazzi | 182/228 |
| 4,804,063 | 2/1989 | Farris | 182/228 |
| 4,935,638 | 6/1990 | Straka | 280/163 |
| 5,193,829 | 3/1993 | Holloway et al. | 280/163 |

*Primary Examiner*—Anne Marie Boehler
*Attorney, Agent, or Firm*—Knobbe, Martens, Olson & Bear LLP

[57] ABSTRACT

An improved side step for motor vehicles designed to mount to tubular side bars. The step includes a mounting insert for placement within the tubular side bars and having structure for attaching the step thereto. The mounting insert fits within an elongated aperture in the tubular side bar, the aperture having a width smaller than the width of the insert. The insert includes a plurality of apertures within which locking members extending downward from the step are secured. The step also includes a pair of end tabs for securing the longitudinal ends of the step under the edge of the aperture in the tubular side bar. The step is provided with a preferred grid of ribs and channels to reduce the amount of material required while providing adequate strength for the step. In one embodiment, the step curves partly around a bend in the tubular side bar.

23 Claims, 6 Drawing Sheets

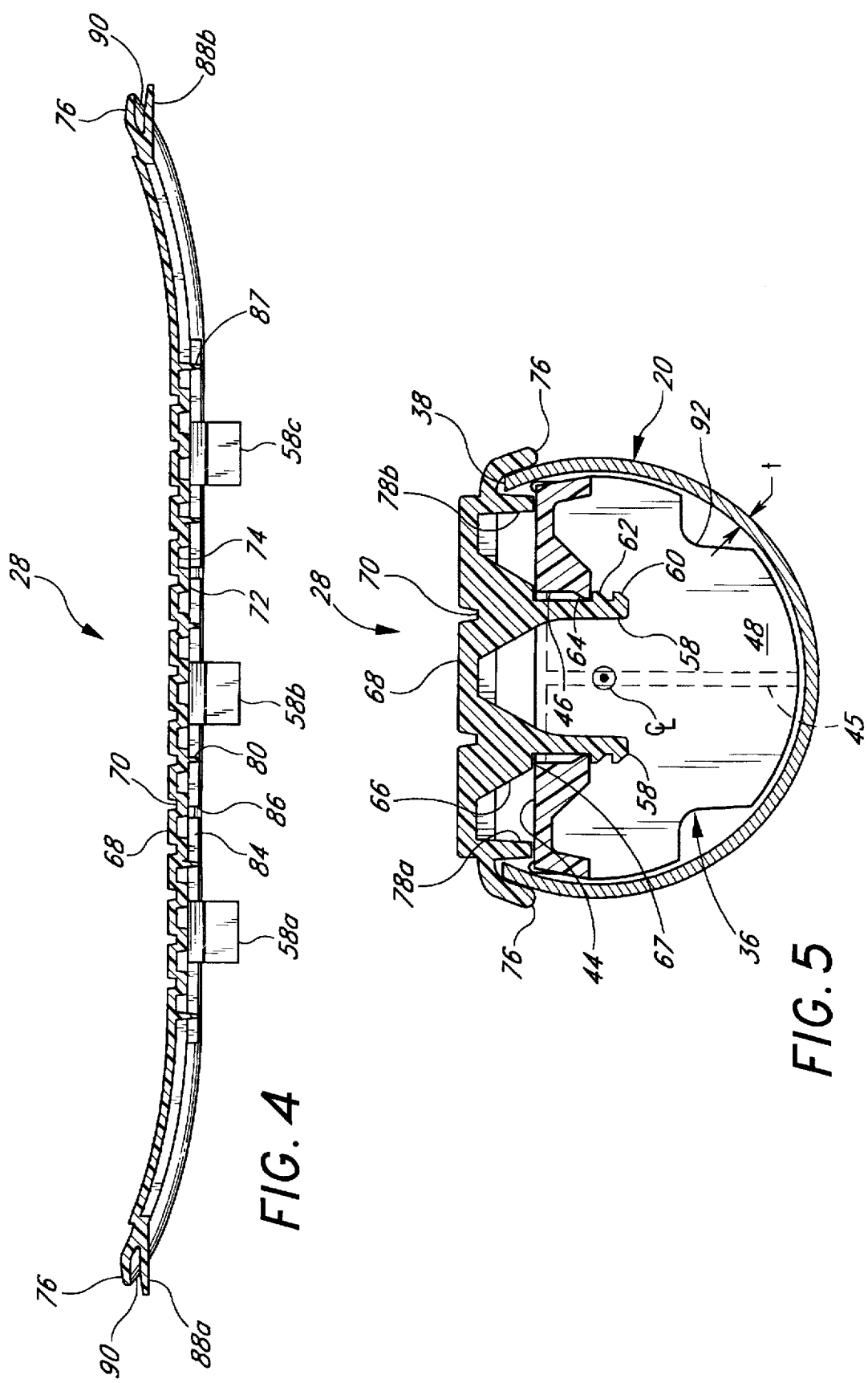

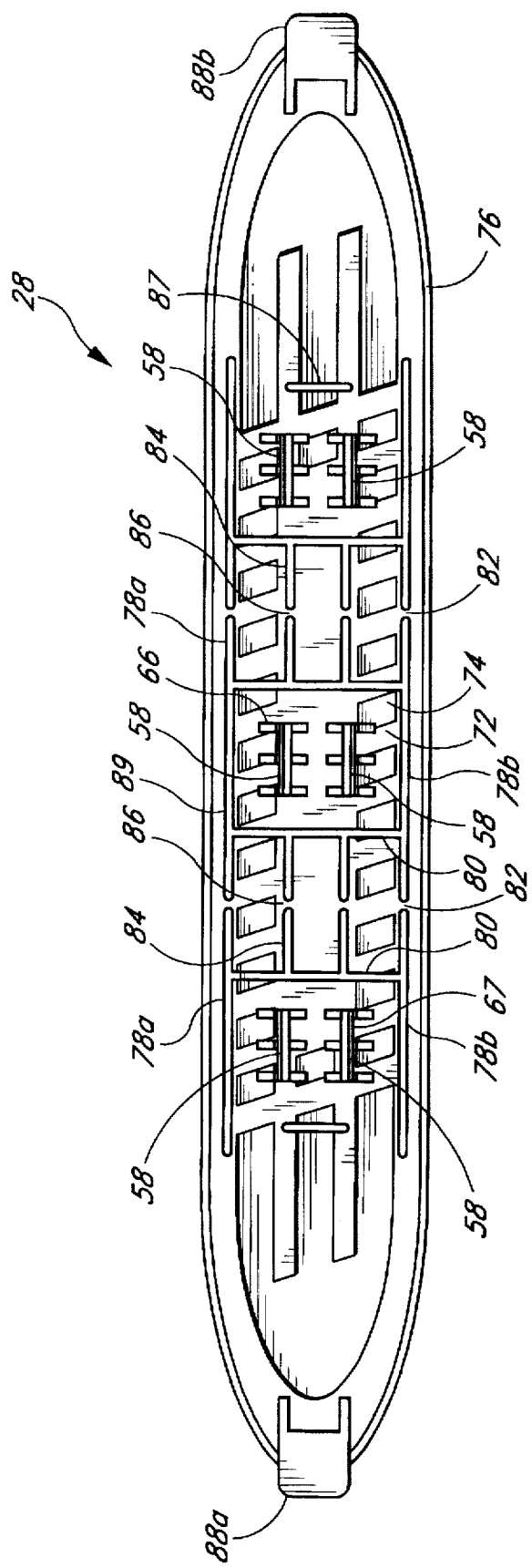
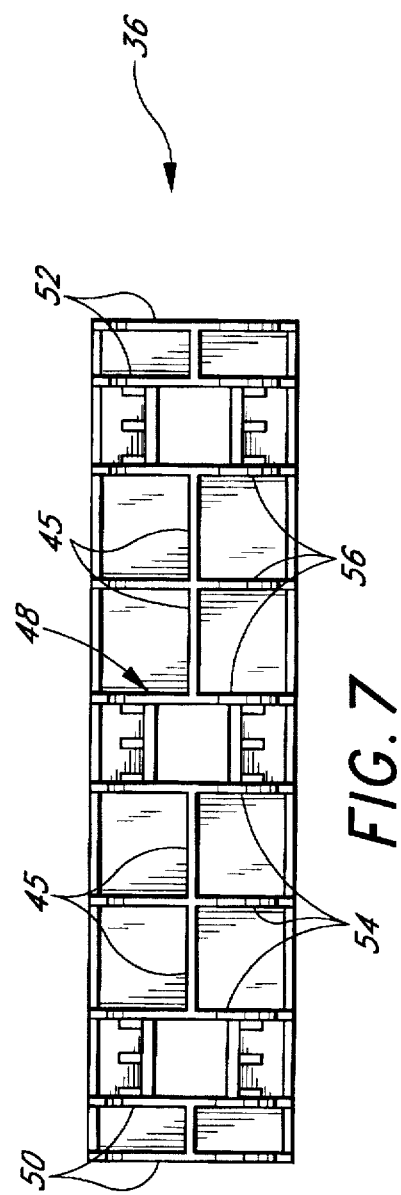
FIG. 6
FIG. 7

SIDE STEP FOR MOTOR VEHICLE

FIELD OF THE INVENTION

The present invention generally relates to motor vehicle side bars for trucks, jeeps and similar motor vehicles and, more particularly, to a step insert for tubular side bars and a method of installing the same.

BACKGROUND OF THE INVENTION

Sport utility and off-road vehicles are designed for off-road use and bad road conditions, and thus are raised off the ground farther than a normal passenger automobile. The increased height of the floor of the passenger cab from the ground makes it difficult to enter and exit these vehicles. Also, when driven off-road, the vehicles are exposed to brush and obstacles which can scratch and dent the vehicle sides and doors. Once limited to off-road enthusiasts, the recent broad popularity of utility vehicles has created a greater market for accessories for these vehicles, as well as a market for on-highway or street vehicles.

One such accessory design to alleviate the aforementioned problems is the side bar. Side bars often consist of a large diameter tubular bar bent into the appropriate shape to fasten to the vehicle chassis below the door. Side bars are bent into a general U-shape with a long straight portion being positioned slightly below the passenger cab on the side of the vehicle. Two inwardly directed short legs extend underneath the vehicle and are attached by bolting or welding to the vehicle chassis. The straight central portion extends the length of the passenger cab and projects slightly to the outside of the vehicle.

By extending slightly outward from the side of the vehicle, the side bars can act as a step to enter and exit the relatively high passenger cabs. Side bars also act as a protective device for the door and side of the vehicle by deflecting brush and blocking rocks and other debris from the vehicle body. Furthermore, tubular side bars, as well as tubular bumpers and roll cages, are also desirable to enhance the vehicle's appearance.

Some manufacturers have attempted to provide a more secure step on the tubular side bars by using a large press to flatten the tube for a short length where a person would normally step to enter or exit the vehicle. Unfortunately, flattening the tubular bar requires expensive tooling and an extremely large press which are not easily adaptable to other uses.

In some cases, a molded plastic sheet is mounted on the flattened step area to provide better footing. The molded plastic sheet may be installed by using adhesive or with rivets. But adhesives are messy, and parts that are glued on are difficult to remove if they are worn or broken and need to be replaced. Riveting requires many small parts, is a labor-intensive process, and requires drilling into the tubular bars. Grip tape around the tubular bar is sometimes used, but it is unsightly and not as safe or effective as a flattened step.

Thus, there exists a need for simpler-to-install, more durable and more easily maintained side step for motor vehicle side bars.

SUMMARY OF THE INVENTION

A two-piece step is provided which can mount over and in an aperture or hole in a tubular side bar of a motor vehicle. The step has a first portion positionable within the side bar, and a second portion secured to the first portion and covering the aperture.

A two piece step is provided for use with a tubular structure such as a side bar, which is fastened to a motor vehicle. The side bar has an elongated aperture or hole of a predetermined length, and a width which is less than the inner diameter of the tubular structure. An insert or retaining member is placed into the hole. To facilitate insertion, the insert has a length and a peripheral dimension that are less than the corresponding length and width of said aperture so that the insert can be inserted into the aperture in one orientation. When rotated or moved into a second orientation, the insert cannot be removed from the aperture.

The insert has a plurality of ribs generally perpendicular to a flat surface on the insert. The ribs have a peripheral shape corresponding to that of the inner surface of the tube, and are thus generally semicircular for side bars made of circular tubes. The insert has at least one recess which contains a retaining shoulder that is accessible through the recess.

A cover is placed over the hole and insert. The cover has a width greater than the width of the aperture and a projection located to correspond with said recess. The projection has a resilient latching member configured and positioned to engage the retaining shoulder when the projection is inserted far enough into the recess. The latching member and shoulder act as a latching and catching mechanism which engage to connect the cover and insert.

Alternatively, the holes and catch can be in the cover and the projections and latch member can be in the insert. The cover may have shorter ribs or projections which rest against the top of the insert to provide support for the cover. Preferably, the cover has a substantially flat surface for a substantial portion of its length to provide an improved stepping surface. In some cases, the cover may extend around a curve of the side bar, and thus have a compound curved surface which extends up and around the curve in a direction perpendicular to the length of the step and generally in the plane of the flat step surface.

To assemble the seep, an elongated hole is cut in the side bar tube, above the centerline of the tube. The insert is rotated to a first orientation in which its smallest dimension fits through the width of the elongated hole. Once through the hole, the insert is rotated to a second orientation in which its peripheral shape is larger than the hole so that the insert cannot fit through the hole. The cover is then attached to the insert. Preferably, the latch and catch mechanism is used, although other fastening means known in the art may be used, including threaded fasteners.

BRIEF DESCRIPTION OF THE DRAWINGS

FIG. 4 is a longitudinal cross-sectional view of the straight side step taken along line 4—4 of FIG. 3;

FIG. 5 is a transverse cross-sectional view of the installed side step and insert within a tubular bar taken along line 5—5 of FIG. 1.

FIG. 6 is a bottom plan view of a straight side step;

FIG. 7 is a bottom plan view of a mounting insert of the present invention;

DESCRIPTION OF THE PREFERRED EMBODIMENTS

Figure 1:
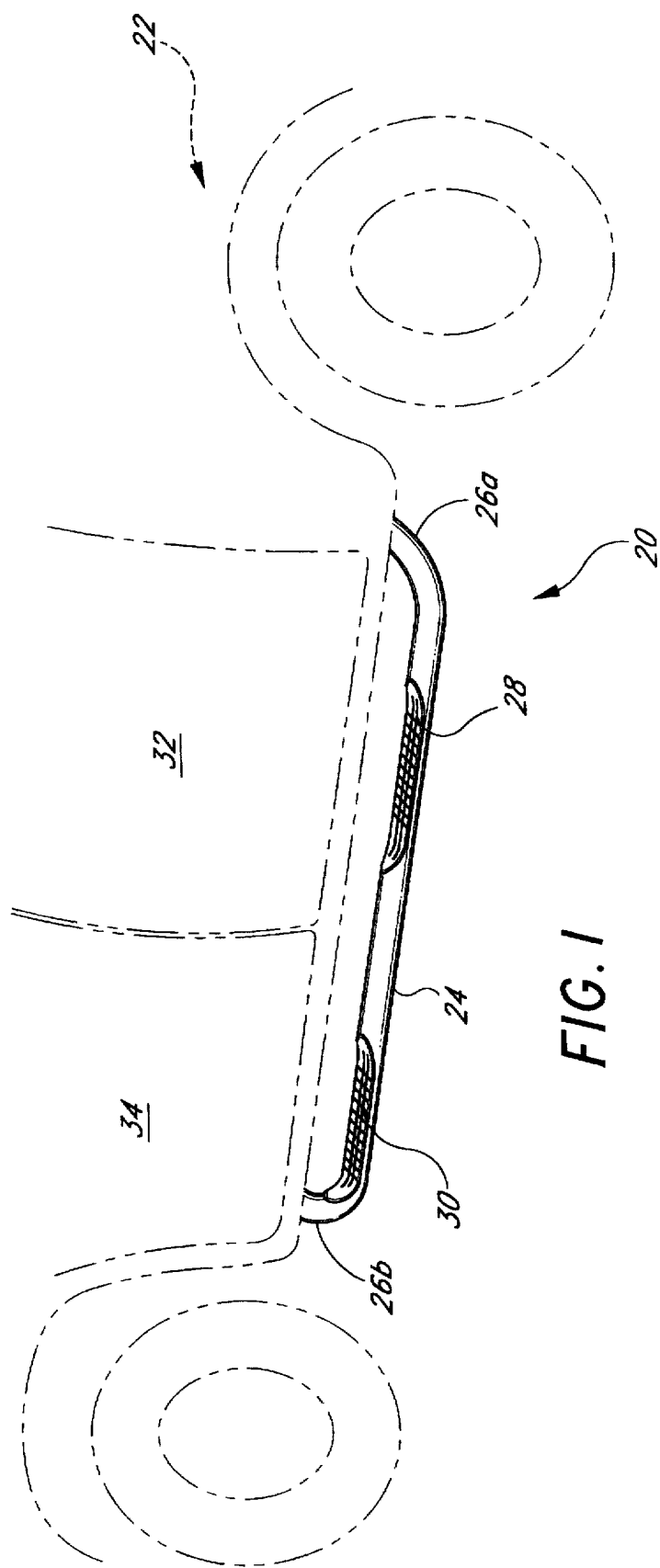
FIG. 1 is a perspective view of two side steps of the present invention mounted on a tubular side bar of a motor vehicle.

FIG. 1 illustrates a side bar 20 attached to the underside of a vehicle 22, partially shown in phantom. The vehicle 22 may be one of any number of sport utility or off-road vehicles, or other such vehicles. The side bar 20 is typically welded or bolted to the underside chassis (not shown) of the vehicle 22 by means well known in the art and thus not described in detail herein. The side bar extends the majority of the distance underneath a passenger compartment and extends along the direction between the front and rear wheels of the vehicle. The side bar 20 is intended as a step-up into the passenger compartment, and functions as a protective guard for the exterior side surfaces of the vehicle 22. Typical side bars 20 comprise rugged tubular steel tubing having a 3-inch diameter and 0.090 inch wall thickness. Of course, other sizes and styles of side bars are available.

The side bar 20 comprises a central straight portion 24 running parallel to the side of the vehicle and a pair of bent legs 26a, 26b, extending underneath the vehicle to attach to the chassis (not shown). For a four-door vehicle, the side bar 20 is fitted with a straight front step 28 and a curved rear step 30. The front step 28 is positioned below and generally centrally with respect to a front door 32 of the vehicle 22. The rear step 30 is positioned below and generally centrally with respect to a rear door 34 of the vehicle 22. The steps 38, 30 are preferably located relative to the doors so that a passenger can easily use the step 28 or 30 to enter and exit the vehicle 22. Alternatively, the vehicle 22 may only have two side doors, and one step below each door.

Figure 2:
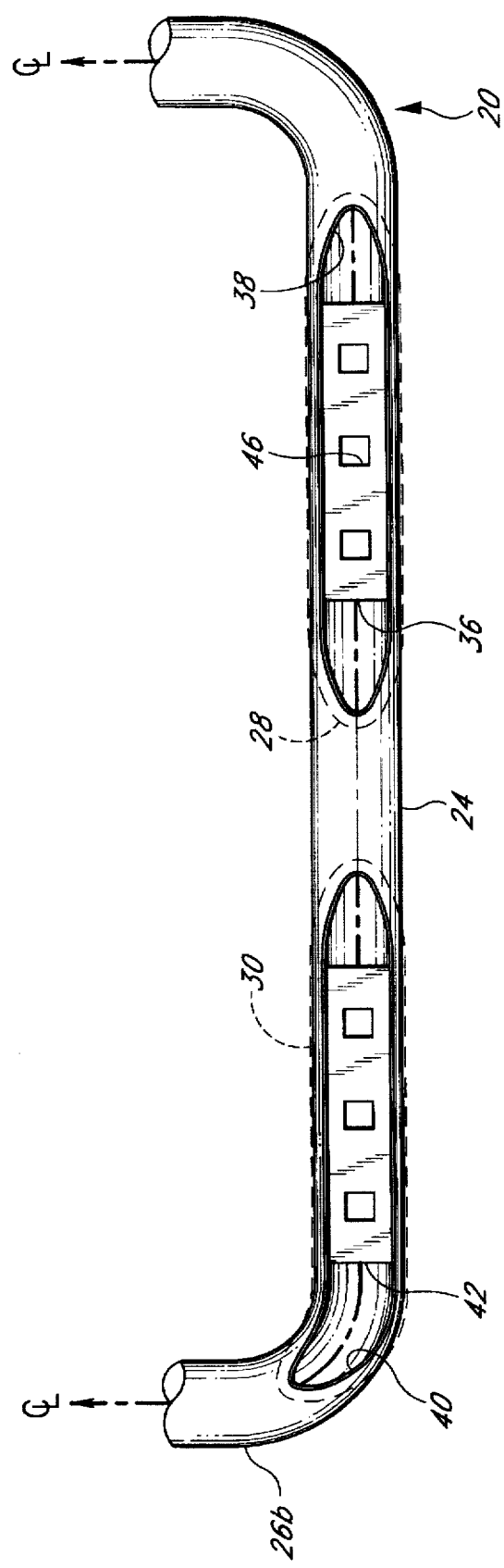
FIG. 2 is a top plan view of the side bar of FIG. 1 with the side steps shown in phantom exposing mounting holes and mounting inserts.
Figure 3:
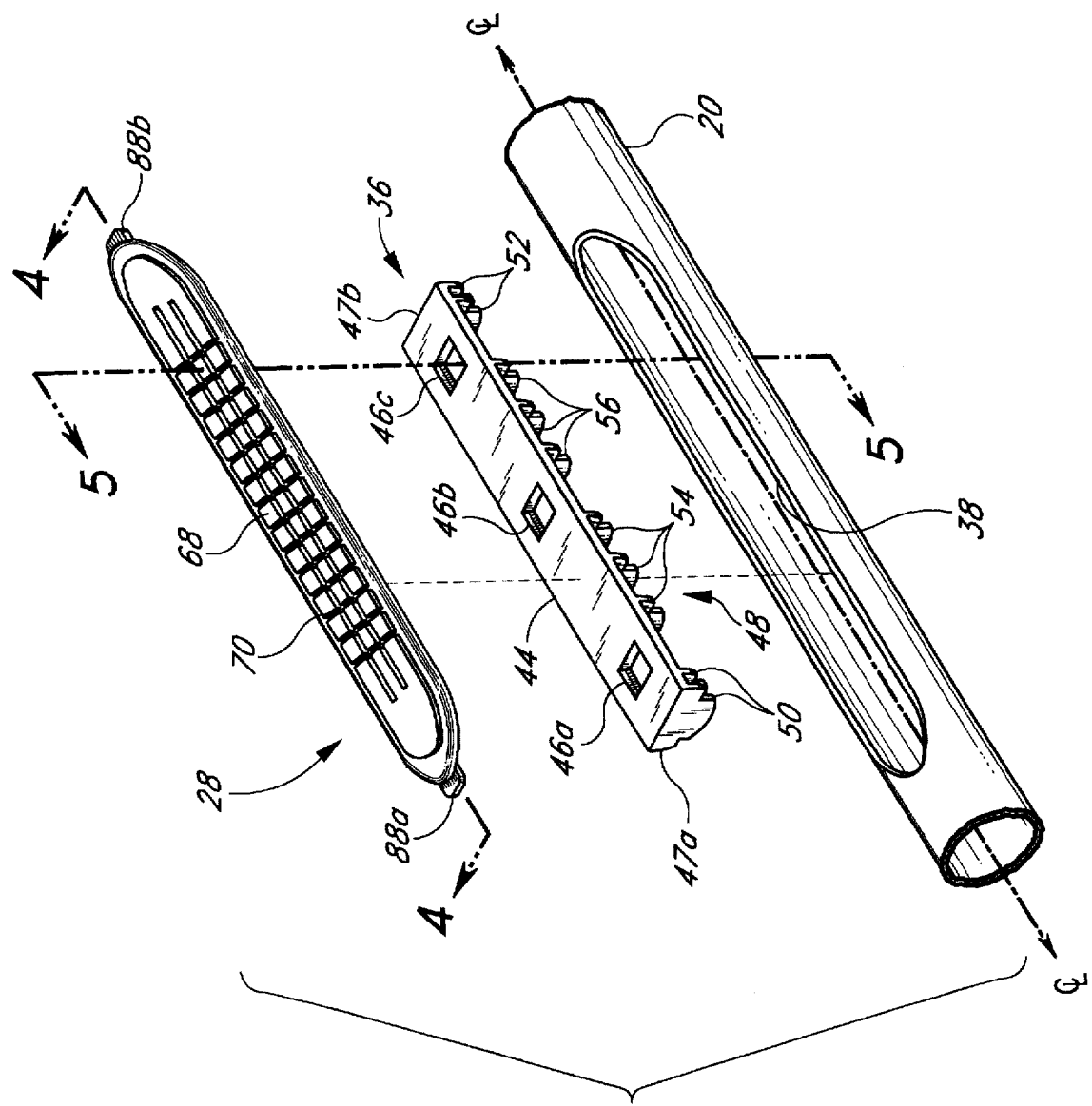
FIG. 3 is an exploded perspective view of the side step, mounting insert and mounting hole in a tubular bar.

Referring to FIGS. 2 and 3, the mounting configuration of the steps 28, 30 is disclosed. FIG. 3 illustrates the straight front step 28 and a mounting insert 36 above the tubular side bar 20. The mounting insert 36 fits through an elongated aperture 38 conforming to the shape of step 28 but slightly smaller. The insert 36 is positioned in the interior of the tubular side bar 20, generally centrally within the elongated aperture 38. The tubular wall thickness of the side bar 22 is shown by "t" in FIG. 5. The step 28 is removably connected to the mounting insert 36 and thus is firmly held in a position covering the aperture 38, as described herein.

FIG. 2 illustrates both the elongated straight aperture 38 and an elongated curved aperture 40 for the curved rear step 30, shown in outline. A portion of the step 30 extends into the curved portion 26b of the side bar 20. Thus, both the step 30 and aperture 40 extend generally along the straight central portion 24 of the'side bar 20 and diverge from this line a short distance around the bend of the rear leg 26b. A mounting insert 42, identical to the first mounting insert 36, for the rear step 30 is positioned generally centrally within the straight portion of the aperture 40. Step 30 is removably connected to insert 42. When the steps 28, 30 are installed, they completely cover the apertures 38, 40, respectively. It can be readily seen that the front step 28 and rear step 30 extend outward beyond the periphery of their respective apertures 38, 40.

The attachment between the step 28 and the mounting insert 36 is shown in FIGS. 3-5. The mounting insert 36 comprises an elongated, rectangular, planar top surface 44 interrupted by a series of apertures 46 aligned along a longitudinal center line of the top surface. The apertures are preferably square, although other shapes can be used. More specifically, the insert 36 includes three square apertures 46a, 46b, and 46c (FIG. 3). A first aperture 46a is positioned proximate a first end 47a of the insert 36. The second square aperture 46b is positioned generally centrally along the insert 36. A third square aperture 46c is positioned proximate a second end 47b of the insert 36.

To strengthen and support the top surface 44, a series of ribs or plates are provided. Thus, the insert 36 further comprises a plurality of planar, generally semicircular ribs 48 extending downward and perpendicular from the top surface 44. Preferably, the ribs 48 have a portion which conforms to the shape of the side bar 20. The specific shape of the ribs 48 can be seen on the end of the insert in FIG. 3, and in cross-section in FIG. 5.

The distribution of the ribs 48 on the insert 36 is best seen in FIG. 7. A first pair of downwardly depending ribs 50 is disposed between the first square aperture 46a and the first end 47a. A second pair of downwardly depending ribs 52 is disposed between the third square aperture 46c and the second end 47b of the insert 36. A first plurality 54 of intermediate ribs is located between the first square aperture 46a and the second square aperture 46b. A second plurality 56 of intermediate ribs is positioned between the second square aperture 46b and third square aperture 46c. A series of longitudinal ribs 45, partially shown in FIG. 3, extends between ribs 50, 52, 54, and 56 along a plane through the center of side bar 20 to strengthen the insert 36. The ribs 45, 48 provide vertical strength for the insert 36 in support of the installed step 28. Gaps are left between the ribs 48 underneath each of the square apertures 46 for a purpose as described below.

FIG. 4 illustrates three downwardly depending locking or latch members 58a, 58b, 58c. The latch members 58 are preferably integrally formed of one piece with step 28. For example, members 58 and step 28 can be molded of one piece of plastic. The latch members 58 are configured and located to fit within the apertures 46 and include locking elements for securely, but removably, attaching the step 28 to the insert 36. As seen in cross section in FIG. 5, each latch member 58 includes a first latching or locking element 60 at the distal end of member 58 and a second latching or locking element 62 disposed inward thereof. The locking elements are formed with angled surfaces and generally horizontal locking surfaces which mate with correspondingly shaped and positioned locking protrusions 64 formed in the lower portions of the sidewalls of the square apertures 46. The catching or locking protrusions 64 are likewise provided with angled surfaces and horizontal locking surfaces to cooperate with the locking elements 60, 62. The locking members 58 are sufficiently thin and pliable so as to flex and allow the locking elements 60, 62 to cam past the locking protrusions 64 and engage the horizontal locking surfaces.

There is thus advantageously provided a latch and catch means for fastening the step 28 to the insert 36. While this is the preferred way of connecting the parts, other fastening means will become apparent to those of skill in the art having the advantage of the present disclosure, including such removable means as threaded fasteners, or more permanent means such as rivets, welding or gluing.

In the illustrated embodiment, the step 28 is provided with six locking members 58, two each for each of the three apertures 46. The mounting insert 36 is thus adapted to be placed within the tubular side bar 20, and the step 28 is then attached thereto by pressing the locking members 58 into the apertures 46 to engage the corresponding locking members 60, 62 with locking protrusion 64 on insert 36. The locking members 58 are deformed slightly when they enter the apertures 46, and thus resiliently engage and lock the step 26 to the insert 36.

There is thus advantageously provided a latch and catch means for fastening the step 28 to the insert 36. While this is the preferred way of connecting the parts, other fastening means will become apparent to those of skill in the art having the advantage of the present disclosure, including such removable means as threaded fasteners, or more permanent means such as rivets, welding or gluing.

Figure 10:
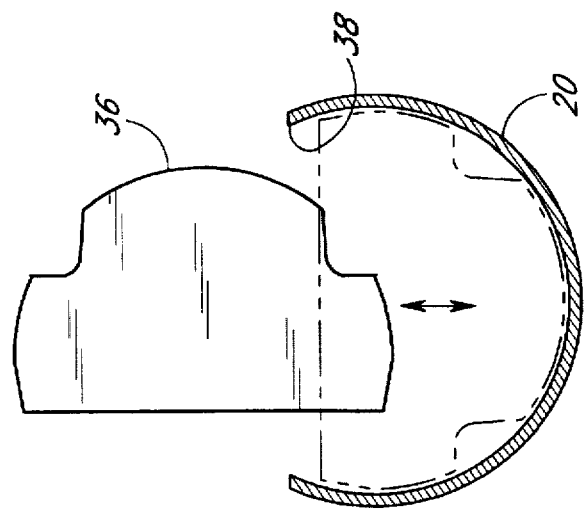
FIG. 10 is an elevational view of an insert during installation within a side bar.
Figure 9:
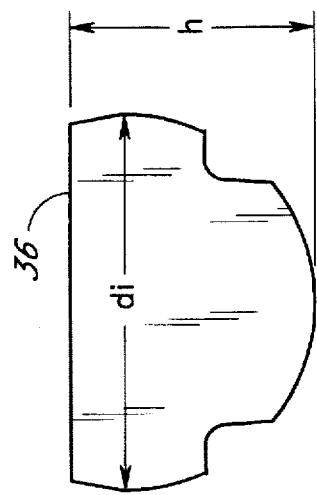
FIG. 9 is an elevational outline of a mounting insert.
Figure 8:
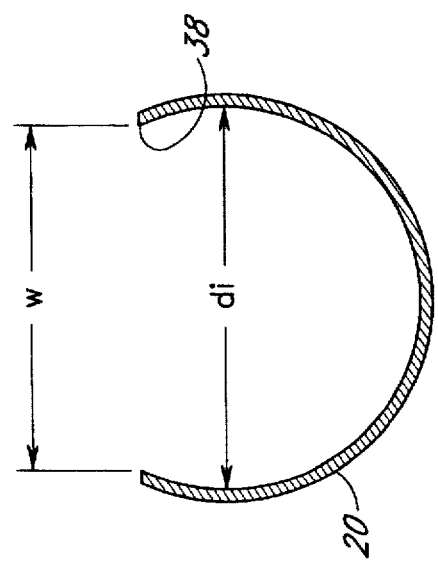
FIG. 8 is a cross-sectional view of the tubular side bar of a motor vehicle.

Referring to FIGS. 5 and 8-10, assembly of the insert 36 with the aperture 40 described. The aperture 40 is cut above the centerline of the side bar 20 by means known in the art, such as a plasma cutter. Thus, the inner diameter of the side bar 20, denoted as "$D_i$," is larger than the width "W" of the elongated aperture. Insert 36 has a maximum peripheral shape generally corresponding to the same diameter $D_i$ as the inner diameter of the side bar 20. But the maximum height "h" of the insert 36 is smaller than the width W of the elongated aperture 38. Thus the insert 36 may be inserted into the elongated opening 38 in one orientation, and then rotated about the central axis of the side bar 20 into a second orientation in which the peripheral shape of the insert 36 is greater than the width "W" of the aperture 38, as illustrated in FIG. 10 (phantom) and FIG. 5. In the rotated orientation, the insert 36 has its generally flat top surface 44 generally aligned with and parallel to the plane of the aperture 38. Because the maximum width ($D_i$) of the insert 36 corresponds to the inner diameter $D_i$ of the side bar 20, and because $D_i$ is greater than the width W of the elongated opening 38, insert 36 cannot be removed from the side bar 20.

After the insert 36 is inside the side bar 20, front step 28 is fastened to the insert, preferably by snapping the step 28 into place so that the members 58 engage the corresponding sides of the apertures 46. This prevents the insert from being rotated and removed from the side bar 20, and holds the step 28 onto the side bar 20. In order to insert the step 28, it must be bent so that the end tabs 88 engage the curved ends of the aperture 38 and further restrain the step 28 from moving forward and backwards along the length of the elongated slot 38.

The particular shape and location of the ribs 48, 50, 52, 54, and 56 will depend upon the particular shape of each side bar. For example, the rib location may be affected by the diameter of the side bar 20 and the length of the step desired to be placed in the side bar. Surface texturing of the step 28 will also affect the rib placement and the location of the various stiffening members in ways known to one skilled in the art having the advantage of the present disclosure. The particular structural details of the step found suitable for the preferred embodiment are described below.

FIG. 6 illustrates a particular pattern of alternating ribs and grooves on the underside of the step 28. FIG. 6 also shows the placement of the six downwardly depending locking members 58. Each locking member 58 is supported at its connection with the main body of the step 28 by a plurality of angled strengtheners 66. A lower step 67 is formed on the outer side of each of the locking members 58 proximate the strengtheners 66, as also shown in FIG. 5.

Referring to FIG. 3, the exterior or upper surface of step 28 comprises a plurality of grid-like traction members 68 on its top surface separated by upper grooves 70. The opposite or lower surface of the step 28 exhibits an opposite pattern of projecting portions 72 and parallelogram-shaped recesses 74. The periphery of the step 28 is provided with a downwardly curved rim 76 adapted to fit around and cover completely the aperture 38, as best seen in FIG. 5. As shown in FIG. 6, the underside of the step 28 is also provided with a plurality of longitudinal and transverse reinforcing ribs extending downward from the portions 72. These reinforcing ribs extend down to terminate in a plane at the approximate elevation as the downwardly curved rim 76, at least in the straight central region. As seen in FIG. 6, the step 28 includes pairs of parallel outer ribs 78a, 78b joined at spaced intervals by transverse ribs 80. The outer ribs 78 are discontinuous at bend points 82 intermediate the central locking member 58b and both the outer locking members 58a and 58c. A plurality of short longitudinally extending ribs 84 extend from the transverse ribs 80 and are likewise separated at bend points 86. The bend points 82 and 86 are aligned transversely across the step 28 for installation purposes, as will be described below. A pair of short transverse rib segments 87 are positioned longitudinally outward from the end locking members 58.

The step 28 further includes a pair of integral end tabs 88a, 88b extending longitudinally outward from the step below the peripheral rim 76. The end tabs 88a,b are provided to secure the longitudinal ends of the step 28 to the aperture 38. The tabs 88 are preferably integrally molded with front step 28 to form a single piece of plastic. More particularly, as shown in FIG. 4, a gap 90 is formed between each of the end tabs 88 and the peripheral rim 76 into which the edge of the tubular side bar 20 formed by the aperture 38 extends. The end of the aperture 38 fits into this gap 40 when the step 28 is installed. Step 28 is thus securely fastened in its central region to the insert 36 positioned within the tubular side bar 20 and on both ends by the end tabs 88 extending underneath the edge of the aperture 38.

The curved step 30 is similar in nearly every respect to the straight step 28 with the exception of the short curvilinear portion on one end which has a complex curvature as it bends toward the chassis and upward from the centerline of the side bar. The common description will not be repeated. On the end which curves into end 26b of the side bar 20, the outer longitudinal ribs 78a, 78b extend around the curve and meet proximate the end tab 88. Furthermore, there are a number of additional transverse reinforcement ribs extending across these longitudinal ribs 78, the location and arrangement of which may be readily determined by one of ordinary skill in the art. The locking members 58 are preferably placed with spacing identical to those on the straight step 28. As seen in FIG. 2, the mounting insert 42 is positioned within the straight central portion 24 of the side bar 20 with respect to the curved aperture 40.

Installation of the Steps

The installation of the steps 28, 30 on the side bar 20 will now be described. As described earlier, and as noted from FIG. 5, the generally semicircular cross-sectional outline of the insert 36 has a transverse dimension approximately equal to the interior diameter of the tubular side bar 20. Furthermore, the aperture 38 is formed at a location above the central plane of the side bar 20. Thus, the transverse distance across the elongated aperture 38 is less than the transverse dimension of the insert 36. The insert 36 is placed sideways through the aperture 38 and then rotated to assume a position in which the square apertures 46 face upward. A plurality of cutouts 92 are provided in the ribs 48 to facilitate the insertion of the mounting insert 36 into the side bar 20.

After the mounting insert 36 is fully inserted within the side bar 20, it cannot be removed directly vertically therefrom due to the interfering material construction. The step 28 is then placed over the aperture 38 and attached to the mounting insert 36. To accomplish this, the end tabs 88a,b must be inserted underneath the longitudinal edges of the aperture 38. The step 28 is bent at the bend points 82, 86 to shorten the distance between the end tabs 88a,b and allow them to be inserted underneath the edge of the aperture 38. Once the end tabs 88 are in place, the locking members 58 are pressed downward to ratchet the locking elements 60, 62 over the locking protrusions 64.

In the final assembled version, as seen in FIG. 5, the outer reinforcing ribs 78a,b contact the upper planar surface 44 of the mounting insert 36. Likewise, the transverse ribs 80 and short longitudinal ribs 84 and 87 contact the upper surface 44 of the mounting insert 36. Furthermore, the steps 67 contact the edges of the square apertures 46 in the mounting insert 36. The distance between the steps 67 and the upper horizontal locking surface of the upper locking element 62 is slightly greater than the distance between the upper surface 44 and lower surface of the locking protrusion 64 to provide a close tolerance fit without substantial looseness. The number of ribs 48 provided on the mounting insert 36 is sufficient to support the weight of a person standing on the step 28.

Construction of Steps and Inserts

The steps 28, 30 may be fabricated using a resin, such as LOMOD AE2080a resin with a tensile strength of approximately 3300 psi and a hardness of 55 Shore D. The inserts 36, 42 are preferably polypropylene. One particularly preferable material is KW 500, manufactured by K. W. Plastics of Troy, Ala. This material has a tensile strength of approximately 3200 psi and a hardness of 65 Shore D. Both the steps 28, 30 and inserts 36, 42 are preferably injection molded to form a single integral piece.

There is thus advantageously provided a means for forming a flat step on a side bar, especially a tubular side bar. There is further provided an advantageous means for providing a side step which extends around the curved portion of a side bar. While only one side bar has been disclosed, it is understood by one of skill in the art that the side bar on the opposite side of the vehicle would be similarly constructed. Similarly, while a curved step has been described as occurring on the rear portion of a tubular side bar, it is appreciated by one of skill in the art that the similar step could occur on the front curved portion of a side bar.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention; and therefore, such adaptations should and are intended to be comprehended within the meaning and range of equivalents of the following claims. Although this invention has been described in terms of certain preferred embodiments, other embodiments that are apparent to those of ordinary skill in the art are also within the scope of this invention, as defined in the claims which follow.

We claim:

1. A step for use with a tubular structure fastened to a motor vehicle, the tubular structure having an elongated aperture with a length and having a width which is less than the inner diameter of the tubular structure, comprising:

an insert having a length and a peripheral dimension that are less than the corresponding length and width of said aperture whereby said insert can be inserted into said aperture in one orientation while not being removed from said aperture wherein a second orientation, the insert having at least one recess therein and a retaining shoulder accessible through the recess;

a cover having a width greater than the width of said aperture and having a projection located to correspond with said recess, the projection having a resilient latching member configured and positioned to engage said retaining shoulder when the projection is inserted sufficiently into said recess.

2. A step as defined in claim 1, wherein said cover has one end which is curved.

3. A step as defined in claim 1, wherein said cover has a longitudinally extending tab depending from opposing ends of said cover configured to engage opposing ends of said aperture whereby longitudinal motion of said cover is restrained.

4. A step for a motor vehicle having a chassis, comprising:

a tube having two ends each of which is adapted to be connected to the chassis of the motor vehicle, the tubular structure having an elongated aperture therein which is located above a centerline of the tube;

an insert inside said tube at said aperture, said insert having a peripheral configuration which is greater than the aperture when the insert is in a first predetermined orientation;

a step-cover having a periphery corresponding in shape to, but greater than, said aperture, said cover having a substantially flat surface for a substantial portion of its length;

a resilient latch connected to one of said insert or step-cover positioned to coincide with a catch connected to the other of said insert or cover whereby said latch and catch engage to connect the cover and insert.

5. A motor vehicle step comprising a tube configured to be connected to a motor vehicle, the step comprising:

an elongated hole located in the tube;

step means located over the hole for forming a substantially flat step on said tube;

retaining means inside the tube and below the hole cooperating with the tube to prevent withdrawal of the retaining means; and a fastener having one end connected to the step means and an opposite end connected to the retaining means.

6. A motor vehicle step as defined in claim 5, wherein said fastener comprises a plurality of locking means depending from the step means for engaging cooperating structure in apparatus in the retaining means to hold the step onto the retaining means.

7. A step apparatus for a tubular component of a motor vehicle, comprising:

a single piece, elongated sheet having opposing ends along a longitudinal axis of the sheet, a generally flat step surface on one side of the sheet, and a mounting surface on the other side of the sheet, the mounting surface having elongated members depending therefrom at three locations along the length of the sheet, the elongated members being resilient and having a latching surface adjacent their distal ends, each end of the sheet having edges on opposite sides of the longitudinal axis with each end extending along the longitudinal axis as the edges curve toward a plane that extends through the longitudinal axis and is generally perpendicular to the elongated sheet, the ends of the sheet further curving toward the step surface and away from the mounting surface;

an elongated retaining device having a substantially flat surface with three apertures along the length of the retaining device and positioned to coincide with the location of the latching members, the apertures containing catching ledges which may be engaged by the latching surfaces; and a plurality of ribs generally perpendicular to the flat surface of the retaining device, the ribs having peripheral portions curved to correspond to the inside diameter of said tube, the retaining device having a height which is less than said diameter.

8. A step apparatus for a tubular component of a motor vehicle, comprising:

an elongated sheet having a generally flat step surface on one side and a mounting surface on the other side, the mounting surface having elongated members depending therefrom at three locations along the length of the sheet, the elongated members being resilient and having a latching surface adjacent their distal ends, the ends of the sheet being rounded and curving toward the step surface and away from the mounting surface, at least one end of the sheet curving toward a direction perpendicular to the length of the sheet and generally in the plane of the flat step surface.

9. A step apparatus adapted to fit onto an elongated hole having opposing sides and ends and cut into a tubular component of a motor vehicle, comprising:

a sheet having an elongated central portion extending along a first axis and having opposing ends, the central portion having an exterior step surface and an interior surface on opposite sides of a substantially flat plane containing the first axis, the ends of the central portion having opposing edges located on opposite sides of, and curving toward, a second plane that extends through the first axis and is generally perpendicular to the substantially flat plane, the ends further curving away from the substantially flat plane toward the exterior step surface, at least one of the ends having a tab offset from the at least one end and configured to engage the tubular component defining one of the ends of the hole when in use.

10. A step apparatus as defined in claim 9, wherein one of the ends further curves in a direction toward a third axis orthogonal to the first and second axis and lying in the plane.

11. A step apparatus as defined in claim 9, wherein both ends have a tab offset from the end.

12. A step apparatus as defined in claim 9, further comprising a first rib depending from the interior surface along one side of the central portion and configured to engage the tubular component defining one side of the hole.

13. A step apparatus as defined in claim 12, further comprising a second rib depending from the interior surface along the other side of the central portion and configured to engage the tubular component defining one side of the hole.

14. A step apparatus as defined in claim 9, further comprising an insert that has a first dimension smaller than the width of the hole to allow the insert to be inserted into the hole, and having a second dimension larger than the width of the hole so that the insert can be rotated inside the hole to prevent removing the insert from the hole, and a fastener connecting the sheet to the insert.

15. A motor vehicle step, comprising:

a tube having an elongated hole located in the tube, the hole being located above a centerline of the tube when the tube is positioned in the orientation in which it is attached to a motor vehicle, the tube having at least one end configured to fasten to a motor vehicle;

an insert inside the tube below the hole, the insert being configured to have a first dimension smaller than the hole to allow the insert to be inserted through the hole into the tube, and having a second dimension larger than the hole to inhibit removal of the insert through the hole;

an elongated step piece configured to cover the hole and form the step on said tube, the step piece being connected to the insert to prevent removal of the step piece from the tube.

16. A motor vehicle step as defined in claim 15, wherein the step piece further comprises an end tab at one end of the step piece to engage an interior portion of the tube to inhibit removal of the step piece.

17. A motor vehicle step as defined in claim 16, wherein there are two end tabs on opposing ends of the step piece.

18. A motor vehicle step as defined in claim 15, wherein the step piece has one end with a curved surface.

19. A motor vehicle step as defined in claim 15, wherein the step piece has one end with a compound curved surface.

20. A motor vehicle step as defined in claim 16, wherein the step piece has one end with a compound curved surface.

21. A step apparatus adapted to fit onto an elongated hole having opposing sides and ends and cut into a tubular component of a motor vehicle, comprising:

a sheet having an elongated central portion extending along a first axis and having opposing ends, the central portion having an exterior step surface and an interior surface on opposite sides of a substantially flat plane containing the first axis, the ends of the central portion being rounded and curving away from that plane toward the exterior step surface along a second axis orthogonal to the first axis, at least one of the ends having a tab offset from the at least one end and configured to engage the tubular component defining one of the ends of the hole when in use, and a first rib depending from the interior surface along one side of the central portion and configured to engage the tubular component defining one side of the hole.

22. A step apparatus as defined in claim 21, further comprising a second rib depending from the interior surface along the other side of the central portion and configured to engage the tubular component defining one side of the hole.

23. A step apparatus adapted to fit onto an elongated hole having opposing sides and ends and cut into a tubular component of a motor vehicle, comprising:

a sheet having an elongated central portion extending along a first axis and having opposing ends, the central portion having an exterior step surface and an interior surface on opposite sides of a substantially flat plane containing the first axis, the ends of the central portion being rounded and curving away from that plane toward the exterior step surface along a second axis orthogonal to the first axis, at least one of the ends having a tab offset from the at least one end and configured to engage the tubular component defining one of the ends of the hole when in use; and an insert that has a first dimension smaller than the width of the hole to allow the insert to be inserted into the hole, and having a second dimension larger than the width of the hole so that the insert can be rotated inside the hole to prevent removing the insert from the hole, and a fastener connecting the sheet to the insert.

* * * * *